US011091189B2

(12) United States Patent
Wyss

(10) Patent No.: US 11,091,189 B2
(45) Date of Patent: Aug. 17, 2021

(54) STEERING SHAFT FOR A MOTOR VEHICLE

(71) Applicants: thyssenkrupp Presta AG, Eschen (LI); thyssenkrupp AG, Essen (DE)

(72) Inventor: Martin Wyss, Brunnen (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 11 days.

(21) Appl. No.: 16/651,734

(22) PCT Filed: Oct. 15, 2018

(86) PCT No.: PCT/EP2018/078111
§ 371 (c)(1),
(2) Date: Mar. 27, 2020

(87) PCT Pub. No.: WO2019/076832
PCT Pub. Date: Apr. 25, 2019

(65) Prior Publication Data
US 2020/0255050 A1    Aug. 13, 2020

(30) Foreign Application Priority Data

Oct. 19, 2017  (DE) ..................... 10 2017 218 741.7

(51) Int. Cl.
*B62D 1/185* (2006.01)
*B62D 1/20* (2006.01)

(52) U.S. Cl.
CPC .............. *B62D 1/185* (2013.01); *B62D 1/20* (2013.01)

(58) Field of Classification Search
CPC . B62D 1/185; B62D 1/16; B62D 1/19; B62D 1/192; B62D 1/20; F16C 29/046
See application file for complete search history.

(56) References Cited

U.S. PATENT DOCUMENTS 6,557,433 B1   5/2003  Castellon
10,619,666 B2 *  4/2020  Muntener ............... F16C 29/04
(Continued)

FOREIGN PATENT DOCUMENTS

DE   203 18 654 U   3/2004
DE   600 35 085 T   2/2008
(Continued)

OTHER PUBLICATIONS

English Translation of International Search Report issued in PCT/EP2018/078111, dated Jan. 23, 2019.
(Continued)

*Primary Examiner* — Paul N Dickson
*Assistant Examiner* — Scott F. Underwood
(74) *Attorney, Agent, or Firm* — thyssenkrupp North America, LLC

(57) ABSTRACT

A steering shaft for a vehicle includes a hollow outer shaft arranged telescopically and coaxially about an inner shaft and connected in a torque-transmitting manner via at least one rolling body. The rolling body bears against the inner shaft and the outer shaft in a positively locking manner in the circumferential direction with regard to a rotation about the longitudinal axis. The steering shaft includes a securing element fixed on the outer shaft and a torque-transmitting coupling section via which the inner shaft and the outer shaft are connected. For an improved redundant transmission of torque in the case of the failure of rolling bodies, the coupling section has at least one transmission body which engages in a loose positively locking connection with regard to a rotation about the longitudinal axis between the rolling body raceways of the inner shaft and the outer shaft.

11 Claims, 4 Drawing Sheets

(56) References Cited

U.S. PATENT DOCUMENTS

2019/0316635 A1    10/2019   Schwarzhans
2020/0189647 A1*    6/2020   Schmidt .................. F16D 3/065

FOREIGN PATENT DOCUMENTS

| DE | 10 2011 051 557 A | 1/2013 | |
|----|---|---|---|
| DE | 10 2014 017 555 A | 6/2016 | |
| DE | 10 2016 216 011 A | 3/2018 | |
| DE | 10 2016 222 795 A | 5/2018 | |
| JP | S57 190 119 A | 11/1982 | |
| KR | 100804583 B1 * | 2/2008 | |
| KR | 20130061216 A * | 6/2013 | |
| KR | 101517078 B1 * | 5/2015 | |
| KR | 20170079712 A | 7/2017 | |
| KR | 20170116267 A * | 10/2017 | |
| WO | WO-2009051395 A1 * | 4/2009 | ............ F16C 29/123 |
| WO | 2015/113770 A | 8/2015 | |
| WO | WO-2018130631 A1 * | 7/2018 | .......... F16C 33/3887 |
| WO | WO-2018138043 A1 * | 8/2018 | ............ F16C 29/046 |
| WO | WO-2018219817 A1 * | 12/2018 | .......... F16C 33/3831 |

OTHER PUBLICATIONS

Din En Iso 683-17 "Heat-treated steels, alloy steels and free-cutting steels—Part 17: Ball and roller bearing Steels", (ISO 683-17:2014); German Version EN ISO 683-17:2014, (Feb. 2015).

\* cited by examiner

STEERING SHAFT FOR A MOTOR VEHICLE

CROSS REFERENCE TO RELATED APPLICATIONS

This application is a U.S. National Stage Entry of International Patent Application Serial Number PCT/EP2018/078111, filed Oct. 15, 2018, which claims priority to German Patent Application No. DE 10 2017 218 741.7, filed Oct. 19, 2017, the entire contents of both of which are incorporated herein by reference.

FIELD

The present disclosure generally relates to a steering shaft for a motor vehicle.

BACKGROUND

Telescoping steering shafts in motor vehicles make an adjustment of the steering column possible, it being possible for the steering wheel position of the steering wheel which is attached to the steering shaft at the rear (with regard to the driving direction) to be set longitudinally, in the axial direction of the steering shaft, in order to adapt the spacing from the driver's position. Moreover, in the case of a crash, the steering shaft can be pushed together in the longitudinal direction, as a result of which it is prevented effectively that the steering column penetrates further into the interior of the passenger compartment and leads to injuries of the occupants. This is achieved as a rule by way of the provision of two shafts which can be telescoped with respect to one another, namely an outside shaft or outer shaft which is configured as a hollow shaft in the form of a tubular hollow profile, and an inside shaft or inner shaft which is mounted therein such that it can be displaced longitudinally, in the direction of the longitudinal axis of the steering shaft. The inner shaft and the outer shaft together form the steering shaft which can be shortened or lengthened by way of telescoping relative movement.

In the case of steering shafts of the generic type which are also called roll sliding shafts, at least one rolling body, as a rule a plurality of rolling bodies, for example balls, serves/serve for configuring a low-friction linear anti-friction bearing system which ensures a long-term smooth-running adjustment of the inner shaft in the outer shaft in the direction of the longitudinal axis in order to set the steering wheel position in the longitudinal direction. The rolling bodies serve at the same time as positively locking elements for the transmission of the torque which is introduced for steering purposes from the inner shaft to the outer shaft. To this end, groove-like rolling body raceways which lie radially opposite one another and run in the longitudinal direction are configured in the inner shaft and the outer shaft, in which raceways the rolling bodies can roll only in the longitudinal direction. With regard to a rotation about the longitudinal axis, the rolling bodies engage in a positively locking manner into the rolling body raceways. As a result, a steering moment which is input as a torque into the inner shaft is transmitted as a force in the circumferential direction from the rolling body raceway of the inner shaft via the rolling face to the rolling body, and from the latter via its other rolling face to the rolling body raceway of the outer shaft. The rolling bodies serve as positively locking elements which are arranged in a positively locking manner between the rolling faces with regard to a transmission of force in the circumferential direction. The rolling bodies roll in the longitudinal direction with a low rolling friction, with the result that they can be inserted virtually without play between the rolling body raceways. This has the advantage that an input steering moment is transmitted practically without play, which makes reliable, precise and low-noise steering possible.

In order for at least a fundamental steering function to continue to be ensured in an emergency if rolling bodies fracture as a result of extreme overloading or are removed from the positively locking connection and fail as primary torque transmission elements for the transmission of the torque, the torque transmission means can be of redundant design. For example, DE 10 2014 017 555 A1 has disclosed providing a securing element for configuring a replacement coupling between the inner shaft and the outer shaft. The securing element has a stop element which is configured as a covering cap and, secured on the free end of the outer shaft against rotation about the longitudinal axis, is fixed firmly so as rotate with it and has a coupling section which engages into the opening cross section between the inner shaft and the outer shaft and engages around the inner shaft at least partially in a positively locking manner, and, as a result, is arranged so as to connect the inner shaft and the outer shaft in a torque-transmitting manner. In this way, the stop element produces a torque-transmitting connection between the inner shaft and the hollow shaft via the coupling section. By virtue of the fact that the stop element is optimized with regard to its shape, dimensions and material primarily for its assembly, stop and sealing properties and, to this end, is manufactured, for example, as a relatively thin-walled component made from a resilient, slidable material such as plastic, it can transmit only a relatively small torque, however, which is smaller than the torque which can be transmitted by way of the rolling bodies.

Thus a need exists for an improved steering shaft which provides an improved redundant transmission of torque in the case of the failure of rolling bodies.

DETAILED DESCRIPTION

Figure 1:
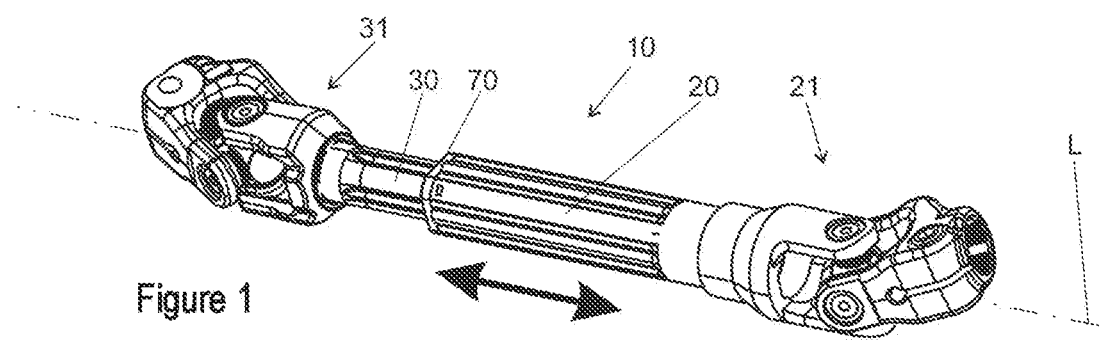
FIG. 1 is a perspective view of a steering shaft.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a"

element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering shaft for a motor vehicle. The steering shaft includes an outer shaft which is configured as a hollow shaft and in which an inner shaft is arranged coaxially which can be telescoped relative to the outer shaft in the direction of a longitudinal axis of the steering shaft and is connected in a torque-transmitting manner to the outer shaft via at least one rolling body, it being possible for the rolling body to roll in the direction of the longitudinal axis. The rolling body bears against the inner shaft and against the outer shaft in a positively locking manner between rolling body raceways in the circumferential direction with regard to a rotation about the longitudinal axis. The steering shaft includes a securing element which is fixed on the outer shaft and has a coupling section which is arranged between the inner shaft and the outer shaft and via which the inner shaft and the outer shaft can be connected in a torque-transmitting manner.

In some examples, the coupling section has at least one transmission body which engages in a loose positively locking connection with regard to a rotation about the longitudinal axis between the rolling body raceways of the inner shaft and the outer shaft.

In the case of the invention, the coupling section is fixed by way of the securing element on the outer shaft in the longitudinal direction and such that it rotates with it. In its basic form, the coupling section is of frame-like or sleeve-shaped or tubular section-shaped configuration, with the result that it can be inserted into the substantially hollow profile-like intermediate space between the inner shaft and the outer shaft. At least one transmission body (also synonymously called a torque transmission body or coupling body in the following text) is arranged on the coupling section in such a way that it is positioned like one of the rolling bodies within the rolling body raceway cross section between the inner shaft and the outer shaft. In contrast to a rolling body which makes contact with the rolling body raceways during the normal operation of the steering shaft in a positively locking connection, the transmission body is in a loose positively locking connection in the rolling body raceway cross section, and has play with respect to the rolling body raceways. To this end, the transmission body cross section can be predefined to be smaller than the rolling body cross section, and can be at a spacing radially and/or in the circumferential direction from the circumference of the rolling body raceway cross section. As a consequence, during normal operation, the torque is transmitted between the rolling body raceways exclusively via the intact rolling bodies.

In the case of the failure of the rolling bodies as primary torque transmission elements, a relative rotation of the inner shaft and the outer shaft occurs, as a result of which the free rolling body raceway cross section is constricted between the rolling body raceways which are then no longer aligned radially. As a result, the transmission body comes into mechanical contact with the rolling body raceways of the inner shaft and the outer shaft. In the case of the failure of the rolling bodies, the positively locking connection which is contact-free and loose in the normal state changes into a real positively locking connection, in the case of which the transmission body bears at the same time against the rolling body raceways of the inner shaft and the outer shaft and acts as a secondary torque transmission element, as a result of which redundancy is provided which ensures the transmission of the steering moment between the inner shaft and the outer shaft. The securing element ensures an improved redundant steering function in the case of the failure of the rolling bodies.

It is one advantage of the invention that the transmission body at least does not make contact with the two rolling body raceways at the same time in normal operation, and, as a consequence, does not cause any mechanical friction between the inner shaft and the outer shaft when they are moved relative to one another in a telescoping manner in the longitudinal direction in order to adjust the steering column. As a result, the adjusting force is not impaired, and undesired noise generation, abrasion and wear are avoided. This can be realized simply by virtue of the fact that a transmission body has a smaller cross-sectional area than a rolling body. The cross-sectional area of the transmission element corresponds to the basic area of the transmission element in a plane which is oriented orthogonally with respect to the longitudinal axis. The cross-sectional area of the rolling body corresponds to the basic area of the rolling body in a plane which is oriented orthogonally with respect to the longitudinal axis, the cross-sectional area being equal to the projection area of the ball in the special case in which the rolling body is configured as a ball.

As a result of the loose arrangement, that material cross section of a transmission body which is available for a positively locking connection in an emergency can be increased in the longitudinal direction without problems, and without it being necessary for friction, wear or the like to be taken into consideration, by way of lengthening to such an extent that the transmission element can redundantly transmit a torque which is comparable in total with all the rolling bodies which are arranged in a rolling body raceway. For example, a transmission body can be configured as a cylindrical pin, a cylindrical roller or a cylindrical bolt, or as a barrel-shaped body, with a slightly smaller diameter than the rolling bodies which are configured, for example, as balls, the cylinder engaging between the rolling body raceways in an axially parallel manner with respect to the longitudinal axis. The length of the cylinder can be dimensioned in such a way that the cylinder cross section which is available for the transmission of torque between the rolling body raceways in the circumferential direction corresponds substantially to at least the sum of the ball cross sections which contribute to this of the balls which are arranged in the relevant rolling body raceway. As a result, the cylindrical transmission element can be shorter in the longitudinal direction than the sum of the ball diameters in said direction, which is advantageous for a compact construction.

A reliable redundant transmission of torque can be realized by virtue of the fact that a transmission body has a higher shear strength with regard to a shear in the circumferential direction between rolling body raceways which lie radially opposite one another than one of the rolling bodies which are arranged therein, preferably than all of the rolling bodies which are arranged therein. This takes into account the fact that a shear loading acts substantially in the circumferential direction on the torque transmission elements (rolling bodies and/or transmission elements) between the rolling body raceways of the inner shaft and the outer shaft.

It is a further advantage of the invention that, with regard to the transmission of torque, the transmission body is functionally equivalent to a rolling body and, in an emergency, transmits the force in the circumferential direction in a positively locking manner between the rolling body raceways which are provided for this purpose of the inner shaft and the outer shaft. The fact that the transmission element according to the invention is fixed by way of the securing element to the outer shaft outside the longitudinal position of the rolling bodies, that is to say is at a longitudinal spacing from the rolling body, additionally ensures that the rolling body raceways are intact in the region of the transmission body, even if the rolling body raceways are damaged or destroyed in the region of damaged or removed rolling bodies, or the holder of the rolling bodies is damaged. As a result, greater reliability can be achieved than would be the case if the transmission body were situated closer to the rolling body, or were fastened to the holder of the rolling bodies, for example to a rolling body cage.

The number of transmission bodies can correspond to the number of rolling body raceways. If, for example, four rolling body raceways are arranged distributed over the circumference, with in each case one or more rolling bodies which are arranged therein, four transmission bodies which are arranged on the coupling section of the securing element can preferably correspondingly dip into in each case one rolling body raceway in a loose positively locking connection. By virtue of the fact that in each case one transmission element is arranged in each of the rolling body raceways, the maximum torque which can be transmitted redundantly can be adapted as far as the order of magnitude of the torque which can be transmitted by the rolling bodies in normal operation. As an alternative, only part of the rolling body raceways can be fitted with transmission bodies, in order to save weight or material, for example.

One development of the invention provides that the coupling section has a carrier, in which at least one separate transmission body can be received. The carrier forms a type of holding and positioning apparatus for the defined positioning of one or more transmission bodies which is/are first of all manufactured separately and is/are subsequently connected to the carrier in order to configure the coupling section, for example by means of positively locking, non-positive and/or integrally joined connections. It is advantageous here that the carrier and the transmission bodies can be adapted to their respective function with regard to their properties independently of one another. The carrier which serves substantially to secure the transmission bodies in a defined spatial position and in the process is to be capable of being assembled easily can be manufactured as a light, thin-walled component from a material with a relatively low mechanical strength, for example from a thermoplastic polymer. A complexly shaped carrier can be manufactured with low complexity from a plastic of this type using injection molding, on which carrier fastening means, connecting means, positioning means, handling means and/or other functional elements can be molded in one piece.

The coupling section can have connecting means which can be connected to the outer shaft in a positively locking and/or non-positive and/or integrally joined manner. The connecting means can have, for example, positively locking elements which can be configured so as to be capable of latching in a sprung manner for connection to the outer tube in a positively locking manner, for example in the form of latching tongues or holding projections. As an alternative or in addition, the connecting means can comprise non-positive elements, for example for frictionally locking fixing in the opening of the outer tube. The connecting means can preferably be configured in one piece on the carrier which is manufactured as a plastic injection molded part. Alternative embodiments with connecting means which are attached separately to the coupling section are likewise conceivable and possible.

The carrier can preferably have at least one fastening means, in which at least one transmission body can be fixed. As fastening means, depending on the number of transmission bodies, one or more receptacles or holders for transmission bodies can be configured on the carrier, for example as formed recesses, openings or depressions of a plastic injection molded part, into which in each case one transmission body can be latched or snapped in a sprung manner with elastic deformation in order to form a positively locking connection. One or more transmission bodies of identical or else different configuration with regard to shape, dimensions or material can be manufactured separately, and can subsequently be connected to the carrier via the fastening means, for example by way of positively locking latching into said injection molded carrier made from plastic.

It is likewise possible to connect a transmission body to the carrier in an integrally joined manner, for example by way of adhesive bonding or welding. If the carrier is manufactured using the plastic injection molding method, a transmission body can also be enclosed completely or partially by way of the plastic by way of overmolding or can be embedded therein, in order to configure an integrally joined and positively locking connection.

The transmission body can preferably consist of a transmission body material, and the carrier can consist of a carrier material which is different than said transmission body material. For example, as described, the carrier can consist as an injection molded part of a thermoplastic which can be manufactured simply and inexpensively, even in complex shapes, and in the process is light and can be of elastic design, as a result of which simple assembly on the outer tube is made possible, and also simple assembly of the transmission body or bodies. As an alternative, the transmission body or bodies can also be inserted into the mold during the production of the carrier, and can be overmolded by the material which forms the carrier. In contrast, a transmission body can be optimized with regard to the loads in the case of the transmission of torque, the transmission body material preferably being harder and/or stronger and/or stiffer than the carrier material, and having a higher breaking strength. For example, a transmission body can be manufactured as a cylindrical pin or cylindrical roller from steel, for example like the rolling bodies from anti-friction bearing steel, for example 100Cr6 in accordance with EN ISO 683-17. As a result, high reliability of the transmission of torque is ensured.

The separate manufacture and provision of the transmission body or bodies make a flexible adaptation to the respective application possible. For example, transmission bodies made from material of different strength or elasticity can be connected selectively to the carrier, in order to realize different transmission properties, or else transmission bodies with different dimensions. It is also conceivable to combine different transmission bodies with one another on one carrier.

It can be provided that the carrier has an outwardly projecting collar which can be supported in the longitudinal direction on the outer shaft. The collar forms a type of head or stop of the securing element according to the invention, from which head or stop the coupling section extends in the longitudinal direction. For attachment, the coupling section can be introduced into the opening of the outer tube between the inner shaft and the outer shaft, until the collar comes into contact on the end side with the outer tube, the coupling section being positioned distinctly in that end region of the outer tube which adjoins the opening. As a result of said plug-like or cap-like construction, the securing element can be assembled simply. The collar can preferably be formed in one piece on a carrier which is configured as a plastic injection molded part.

Sealing elements can be attached to the coupling section, preferably to the carrier, in order to prevent a penetration of contaminants between the inner shaft and the outer shaft, and also to counteract a discharge of lubricant. The sealing element might be configured, for example, as a cord ring seal or as an O-ring.

In one preferred embodiment, the securing element is configured as a pull-out securing means which prevents complete pulling of the inner shaft out of the outer shaft. By way of said pull-out securing means, a force flow is transmitted in the direction of the longitudinal axis from the inner shaft to the outer shaft, said force flow being conducted via stop elements of the inner shaft which project radially to the outside from the inner shaft, the ball cage, and the securing element, to a projection of the outer shaft. The securing element therefore limits the telescoping capability or the telescoping movement of the inner shaft with respect to the outer shaft.

FIG. 1 shows a perspective view of a diagrammatically illustrated steering shaft 10 which has an outer shaft 20 (also called an outside shaft or hollow shaft) and an inner shaft 30 (also called an inside hollow shaft) which can be telescoped with respect to one another in the direction of the longitudinal axis L, that is to say in the longitudinal direction which is indicated by way of the double arrow.

At its outer end which faces away from the inner shaft 30 in the longitudinal direction, the outer shaft 20 has a fork 21 which forms a part of a universal joint, by way of which the steering shaft 10 can be connected to the steering line in a moment-transmitting manner. In a corresponding manner, at its outer end which faces away from the outer shaft 20 in the longitudinal direction, the inner shaft 30 has a fork 31 which can form a part of a further universal joint, by way of which the steering shaft 10 can be connected to the steering line in a moment-transmitting manner. The inner shaft 20 and the outer shaft 30 are preferably manufactured from steel with satisfactory cold forming properties.

The inner shaft 30 is inserted coaxially into the open internal cross section of the outer shaft 20, and can be displaced in a telescoping manner longitudinally in both directions relative to said outer shaft 20, as indicated in FIG. 1 by way of the double arrow.

Figure 2:
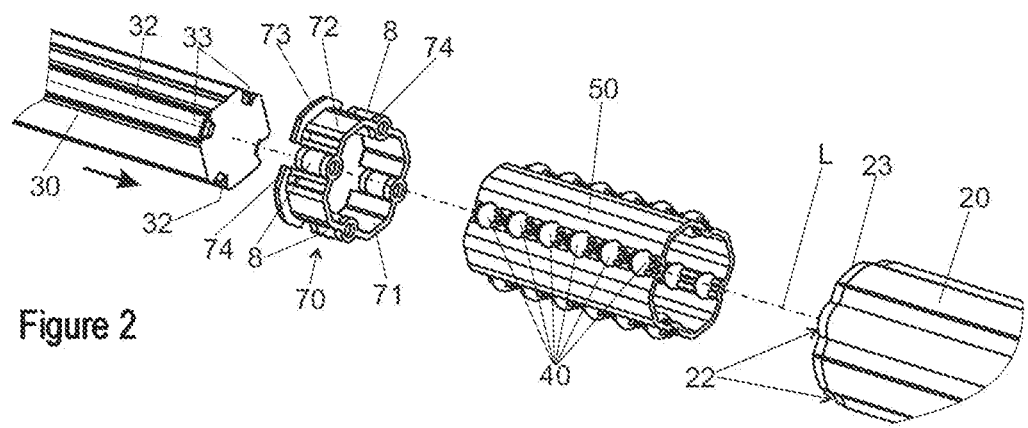
FIG. 2 is an exploded perspective view of a part of a steering shaft according to FIG. 1.

FIG. 2 shows a part of the steering shaft 1 according to FIG. 1 in an exploded illustration, in the case of which the individual constituent parts are shown pulled apart from one another in the longitudinal direction, that is to say in the direction of the longitudinal axis L. It is apparent from this that the outer shaft 20 is profiled in its circumferential region which faces the inner shaft 30 and into which the inner shaft 30 can be pushed in the longitudinal direction as indicated by way of the arrow. The profiling of the outer shaft 20 comprises rolling body raceways which are configured as grooves 22 and extend in the inner circumferential surface in the longitudinal direction. Convexly projecting bead-like shaped-out formations are configured in the outer circumferential surface so as to lie opposite the grooves 22 on the outside with regard to the wall of the outer shaft 20. In the embodiment which is shown, both the inner shaft 30 and the outer shaft 20 are configured as hollow profiles with a substantially square cross-sectional basic shape. Here, a total of four grooves 22 are arranged distributed uniformly over the circumference of the outer shaft 20, namely in each case in the center of one of the sides of said square cross section. The grooves 22 are configured as rolling body raceways, specifically as ball raceways.

That end section of the inner shaft 30 which faces the outer shaft 20 and can be pushed in a telescoping manner into the latter is likewise profiled, as shown in FIG. 1. The profiling likewise comprises rolling body raceways in the form of grooves 32 which extend from the end which can be plugged into the outer shaft 20 in the outer circumferential surface of the inner shaft 30 in the longitudinal direction, that is to say in the direction of the longitudinal axis L. The grooves 32 extend over that part section of the inner shaft 30 which can be pushed into the outer shaft 20 in the longitudinal direction.

Balls 40 are arranged as rolling bodies between the inner shaft 30 and the outer shaft 20 in the rolling body raceways which are delimited by way of grooves 22 and 32 which lie radially opposite one another in each case in pairs. In each case a plurality of (in the example which is shown in FIG. 2, six) balls 40 are arranged behind one another in the longitudinal direction in each case in a rolling body raceway. Here, they are held at a defined spacing relative to one another such that they can be rotated freely in a sleeve-shaped rolling body cage or ball cage 50.

In normal operation, the balls 40 lie in the grooves 22 and 32, and roll or turn therein in the case of a relative displacement in the longitudinal direction between the outer shaft 20 and the inner shaft 30, with the result that a smooth-running and secure roller-mounted linear guide is formed. By virtue of the fact that the cross section of the balls 40 fills the rolling body raceways in a positively locking manner, which rolling body raceways are delimited by way of the grooves 22 and 32, said balls 40 produce a positively locking connection in the circumferential direction between the inner shaft 30 and the outer shaft 20 and, as a consequence, a torque-transmitting connection. As a result of the positively locking connection, an introduced steering moment can be transmitted practically without play between the inner shaft 30 and the outer shaft 20.

Figure 3:
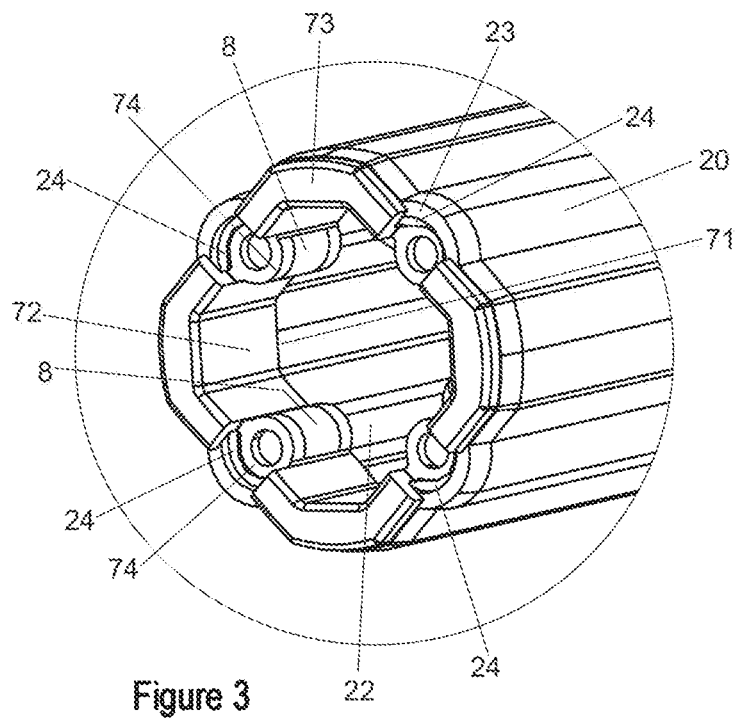
FIG. 3 is a detailed perspective view of the steering column according to FIG. 1.
Figure 4:
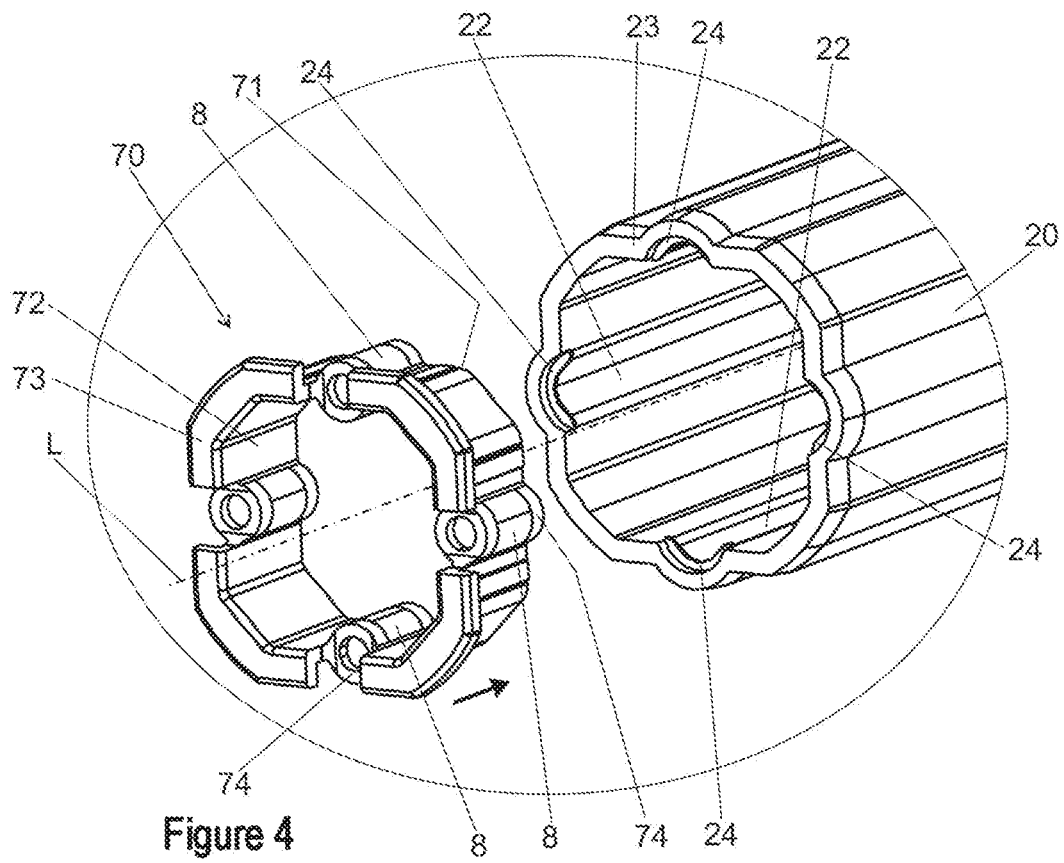
FIG. 4 is an exploded perspective view of the detail shown in FIG. 3.

A securing element 70 according to the invention is inserted in the longitudinal direction into the opening of the outer shaft 20, as indicated in FIG. 2 and FIG. 4 by way of the arrow, until the assembly position which is shown in FIG. 3 is reached.

The securing element 70 has a carrier 71 which comprises a coupling section 72 and a collar 73 which projects radially to the outside from the latter. The coupling section 72 has a hollow profile section-shaped basic shape which can be inserted with play into the intermediate space between the inner shaft 30 and the outer shaft 20. In the example which is shown, the coupling section 72 has a total of four receptacles 74 as fastening means.

The carrier 71 including the collar 73 and the coupling section 72 with the receptacles 74 is manufactured as a plastic injection molded component from thermoplastic polymer which forms the so-called carrier material.

In each case one transmission body 8 (in the example which is shown, a cylindrical pin or bolt) is attached in the receptacles 74, which transmission body 8 consists of a transmission body material which has a higher strength than the abovementioned carrier material, for example steel. The transmission bodies 8 have a longitudinal axis Z and a smaller diameter than the balls 40.

Figure 5:
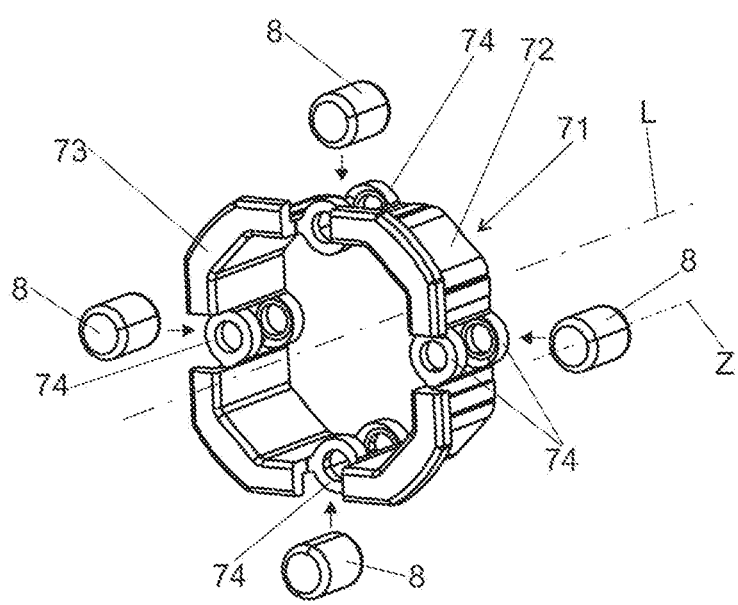
FIG. 5 is an exploded perspective view of the securing element of the steering column according to FIGS. 2-4.

The receptacles 74 are formed and dimensioned as open recesses in such a way that in each case one transmission body 8 can be snapped into said receptacles 74 with elastic widening of the plastic, for example in the radial insertion direction, as indicated by way of the arrows in the state shown in FIG. 5 before the assembly. In the assembled state which is ready for installation, as shown in FIGS. 2, 3 and 4, each transmission body 8 is held in a receptacle 74 in a positively locking manner. As an alternative or in addition, a non-positive and/or integrally joined fastening can take place, for example by way of adhesive bonding or welding or by way of overmolding by means of the material of the carrier 71.

In the mounted state of the steering shaft 10, the coupling section 72 is inserted into the opening of the hollow shaft 20, as shown in FIG. 3, it being possible for the carrier 71 to be pressed with the coupling section 72 into the outer shaft in a non-positive and/or positively locking manner, until the collar 73 bears in the longitudinal direction against the end face 23 of the outer shaft 20 (see FIG. 4). Here, the transmission bodies 8 which are held in the receptacles 74 are arranged between the grooves 22 and 32, and are oriented with their longitudinal axis Z parallel to the longitudinal axis L. Here, they are positioned in a loose positively locking connection in such a way that they have play S with respect to the grooves 22 and 32, in other words are spaced apart from the rolling body raceways which receive the balls 40 without play.

The illustrations of FIGS. 6 to 9 show a further embodiment of a securing element 70 according to the invention. Like the first embodiment according to FIGS. 1 to 5, it has a coupling section 72 which is preferably configured as a plastic injection molded part, and likewise has four receptacles 74 which are distributed over the circumference and in which in each case one cylindrical transmission body 8 is fastened, for example is snapped in in a positively locking manner.

One difference from the first embodiment is that the securing element 70 does not have a collar 73, and, as a result, the coupling section 72 in this design is identical to the carrier 71. Otherwise, the arrangement, the function and the action of the coupling section 72 which is fixed on the outer shaft 20 and of the transmission bodies 8 are in principle identical.

Figure 6:
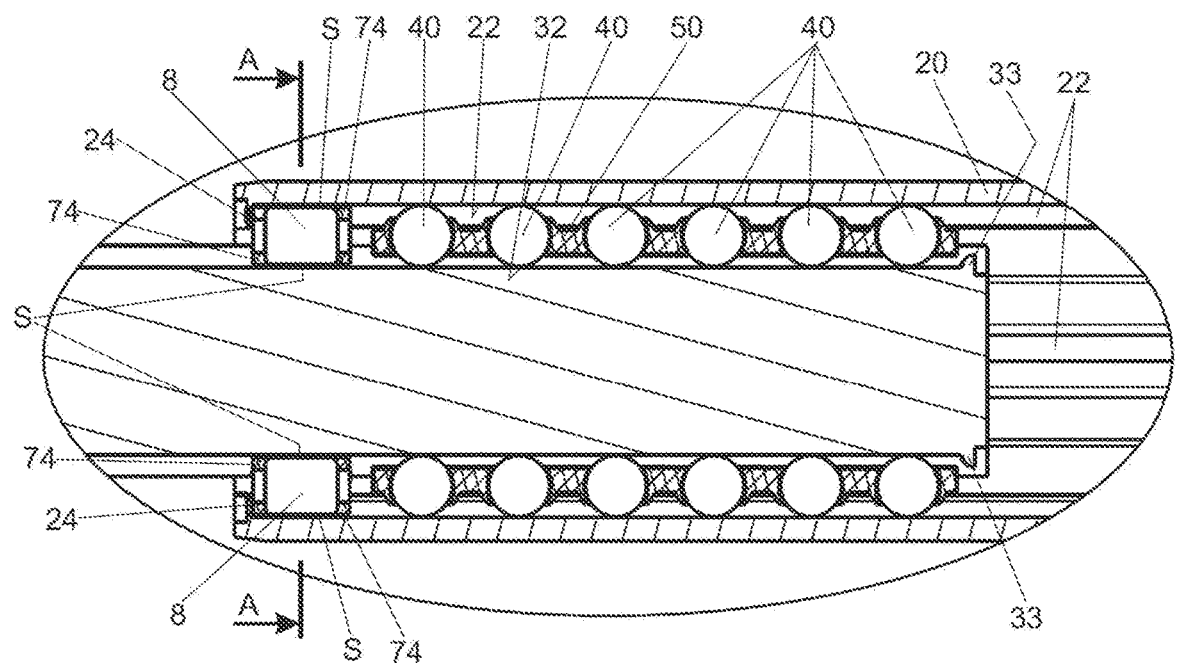
FIG. 6 is a longitudinal sectional view through a second embodiment of a steering column.
Figure 7:
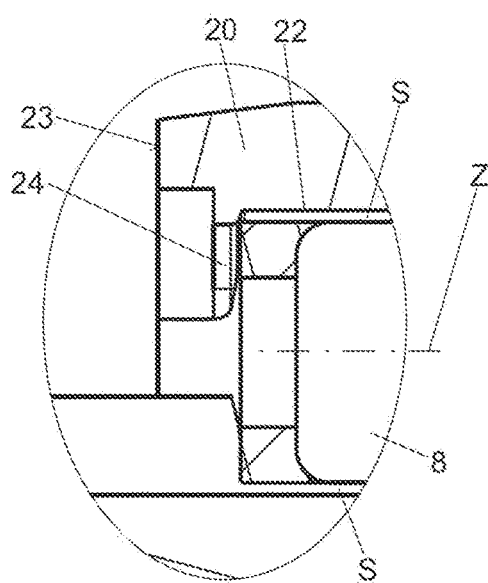
FIG. 7 is a detailed view of the longitudinal section according to FIG. 6.
Figure 8:
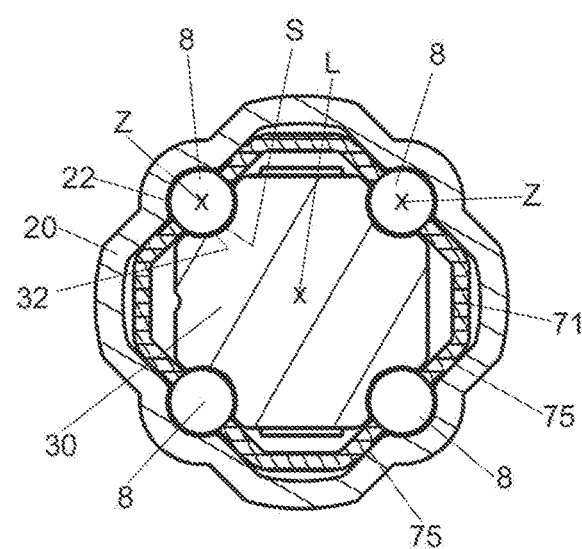
FIG. 8 is a cross section A-A of the steering column according to FIG. 6.

It can be seen clearly in the longitudinal section of FIG. 6 that the coupling section 72 of the securing element 70 is arranged, like the ball cage 50, in the radial intermediate space between the inner shaft 30 and the outer shaft 20. Whereas the balls 40 bear against the grooves 22 and 32 such that they can roll without play, the transmission bodies 8 which are fixed via the securing element 70 on the outer shaft 20 have play S with respect to the grooves 22 and 32, as can be seen clearly in the enlarged longitudinal section of FIG. 7 and the enlarged cross section of FIG. 9. The arrangement and the dimensions of the transmission bodies 8 and the configuration and arrangement of the ball cage 50 in the case of the second embodiment according to FIGS. 6 to 9 are in principle comparable with those of the first embodiment which is shown in FIGS. 1 to 5.

Figure 9:
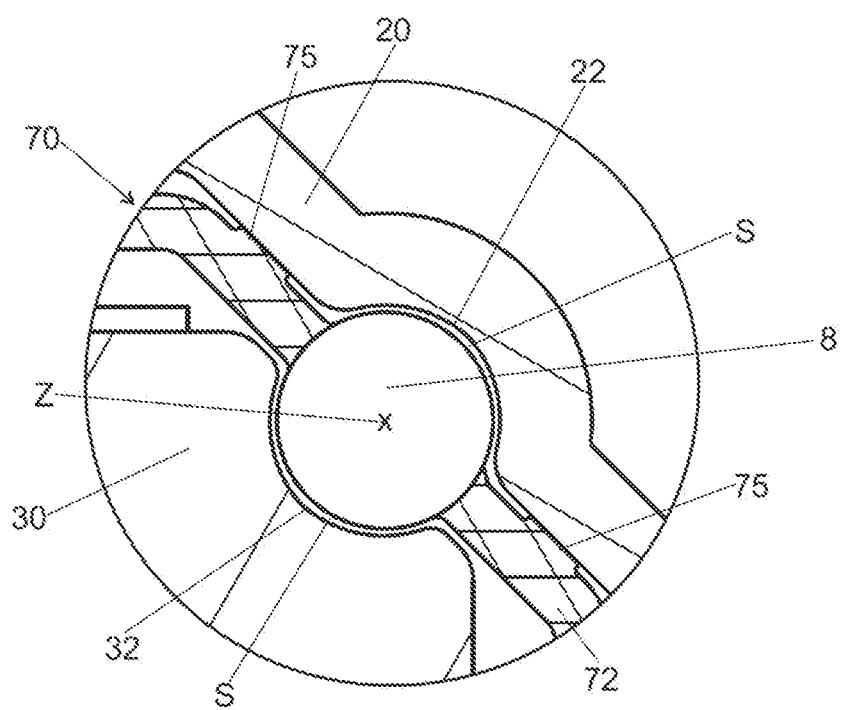
FIG. 9 is a detailed view of the cross section according to FIG. 8.

For fixing in the opening of the outer shaft 20, the coupling section 72 has fastening elements 75 which can be configured as holding projections, for example as shown in FIG. 9, which fix the coupling section 72 on the inner side of the outer shaft 20 in a non-positive and/or positively locking and/or integrally joined manner. The fastening elements 75 can likewise be formed in one piece on the carrier 71 in the plastic injection molding operation. As a result, the transmission bodies 8 can be fixed in a positionally precise manner, with the result that they have play S with respect to the grooves 22 and 32, as can be seen clearly in FIGS. 9 and 7.

In the longitudinal direction, the securing element 70 is fixed in the outer shaft 20 by way of a projection 24 which projects into the opening cross section into the intermediate space between the inner shaft 30 and the outer shaft 20, for example by way of one or more calked portions or the like which are made in the end face 23. By virtue of the fact that the securing element 70 is fixed in the outer shaft 20 in the longitudinal direction, it forms a longitudinal stop for the ball cage 50 which is therefore likewise secured against being pulled out of the outer shaft 20.

In its end region, the inner shaft 30 has a stop element 33 which projects to the outside into the intermediate space toward the outer shaft 20 and, in the case of the inner shaft 30 being pulled out, comes into contact with the ball cage 50 or a rolling body 40 which is guided in the ball cage 50, the ball cage 50 coming into contact with the securing element 70 and therefore serving as a pull-out securing means. As a result of said described pull-out securing means, a force flow is provided in the direction of the longitudinal axis L from the inner shaft 30 to the outer shaft via the stop elements 33, the ball cage 50, the securing element 70 and the projection 24. The securing element 70 therefore limits the telescoping capability of the inner shaft 30 with respect to the outer shaft 20.

In normal operation, the balls 40 serve as torque transmission elements. The transmission bodies 8 which are positioned in the loose positively locking connection by way of the carrier 71 are not in contact with the faces of the grooves 22 and 32, and therefore also do not cause any undesired friction or wear. In the case of the failure of the balls 40, the transmission bodies 8 pass in the circumferential direction into a real positively locking connection between the grooves 22 and 32, with the result that they then ensure the transmission of torque. It is one advantage of the fixing according to the invention of the transmission bodies 8 on the outer shaft 20 that, even if the ball cage 50 is deformed or damaged by way of overloading, the securing of the transmission bodies 8 in the coupling section 72 is not impaired, and a redundant transmission of torque is ensured.

LIST OF DESIGNATIONS

10 Steering shaft
20 Outer shaft
21 Fork
22 Groove (rolling body raceway)
23 End face
24 Projection
30 Inner shaft
31 Fork
32 Groove (rolling body raceway)
33 Stop elements
40 Ball
50 Ball cage
70 Securing element
71 Carrier
72 Coupling section
73 Collar
74 Receptacle
75 Fastening element
8 Transmission body
L Longitudinal axis
Z Longitudinal axis
S Play

What is claimed is:

1. A steering shaft for a motor vehicle, the steering shaft comprising:
a hollow outer shaft;
an inner shaft arranged coaxially within the outer shaft, the inner shaft configured to telescope relative to the outer shaft in the direction of a longitudinal axis of the steering shaft;
a rolling body that connects in a torque-transmitting manner the outer shaft to the inner shaft;
wherein the rolling body is configured to roll in the direction of the longitudinal axis, said rolling body bearing against the inner shaft and against the outer shaft in a positively locking manner between rolling body raceways in the circumferential direction with regard to a rotation about the longitudinal axis; and
a securing element fixed on the outer shaft, the securing element comprising a coupling section disposed between the inner shaft and the outer shaft and configured, in a torque-transmitting manner, to connect the inner shaft and the outer shaft;
wherein the coupling section includes a transmission body which engages in a loose positively locking connection with regard to a rotation about the longitudinal axis between the rolling body raceways of the inner shaft and the outer shaft.

2. The steering shaft of claim 1 wherein the coupling section has a carrier, in which at least one separate transmission body is receivable.

3. The steering shaft of claim 2 wherein the carrier has at least one fastening means, on which the transmission body is fixable.

4. The steering shaft of claim 2 wherein the transmission body consists of a transmission body material, and the carrier consists of a carrier material which is different than said transmission body material.

5. The steering shaft of claim 4 wherein the transmission body material is harder and/or stronger and/or stiffer than the carrier material.

6. The steering shaft of claim 1 wherein the coupling section has connecting means which is configured to connect to the outer shaft in a positively locking and/or non-positive and/or integrally joined manner.

7. The steering shaft of claim 1 wherein the number of transmission bodies corresponds to the number of rolling body raceways.

8. The steering shaft of claim 1 wherein said transmission body has a smaller cross-sectional area than said rolling body.

9. The steering shaft of claim 1 where said transmission body has a higher shear strength with regard to a shear in the circumferential direction between rolling body raceways which lie radially opposite one another than one of the rolling bodies which are arranged therein.

10. The steering shaft of claim 1 wherein the carrier has an outwardly projecting collar which is configured to be supported on the outer shaft.

11. The steering shaft of claim 1 wherein the securing element is configured as a pull-out securing means which prevents complete pulling out of the inner shaft from the outer shaft.

* * * * *